United States Patent [19]
Maas

[11] Patent Number: 5,596,325
[45] Date of Patent: Jan. 21, 1997

[54] FM-CW RADAR TRANSCEIVER

[75] Inventor: Stephen A. Maas, Long Beach, Calif.

[73] Assignee: Nonlinear Technologies, Inc., Long Beach, Calif.

[21] Appl. No.: 499,727

[22] Filed: Jul. 7, 1995

[51] Int. Cl.[6] ............... G01S 13/58; G01S 13/62
[52] U.S. Cl. ............... 342/28; 342/114; 342/175; 342/198
[58] Field of Search ............... 342/28, 114, 175, 342/198

[56] References Cited

U.S. PATENT DOCUMENTS

| | | | |
|---|---|---|---|
| 4,176,351 | 11/1979 | DeVita et al. | 342/111 |
| 4,241,347 | 12/1980 | Albanese et al. | 342/89 |
| 5,134,411 | 7/1992 | Adler | 342/130 |
| 5,181,037 | 1/1993 | Komatsu | 342/70 |
| 5,229,774 | 7/1993 | Komatsu | 342/70 |
| 5,268,692 | 12/1993 | Grosch et al. | 342/70 |
| 5,359,331 | 10/1994 | Adler | 342/124 |

Primary Examiner—John B. Sotomayor
Attorney, Agent, or Firm—Philip T. Virga

[57] ABSTRACT

An FM-CW radar transceiver comprising an oscillator connected to an input of a power divider having first and second terminal outputs. The first terminal output of the power divider is connected to an input of a first diode and a first shorted stub. The second terminal output of the power divider is connected to an input of a phase shifter with the output of the phase shifter connected to an input of a second diode and a second shorted stub. The outputs of the first and second diodes are each connected to inputs of first and second intermediate frequency (IF) filters and then through first and second IF blocking structures terminating at a common antenna port. An open stub is connected to the common antenna port with the outputs of the first and second IF filters each connected to an IF port or channel. In use, the FM-CW transceiver operates as a frequency multiplier for transmitting, and simultaneously as a subharmonically pumped "I/Q" mixer for reception.

20 Claims, 3 Drawing Sheets

FM-CW RADAR TRANSCEIVER

BACKGROUND OF THE INVENTION

This invention generally relates to FM-CW radar transceivers for use in motion-detector applications. More particularly, this invention relates to an improved FM-CW radar transceiver that implements both the transmitter and receiver of a conventional FM-CW transceiver into a single circuit.

It is well known that an FM-CW radar is used fundamentally to detect motion and to measure the speed of that motion. Additionally, it is well known that conventional FM-CW radars use a separate receiver and transmitter with means of multiplexing the transmitted and received signals onto a single antenna by use of either a circulator or a directional coupler.

Typically, the transmitter portion of a conventional FM-CW transceiver consists of an oscillator, power divider, and power amplifier wherein the receiver portion consists of a low-noise amplifier and a pair of "I-Q" mixers. The circulator is used to connect the receiver and transmitter to the same antenna or alternatively, because it is less expensive, a directional coupler may be used in systems where high loss is tolerable.

However, these types of conventional FM-CW transceiver systems typically require ten (10) to twenty (20) solid-state devices in association with a large number of passive components, and the use of complex DC power supplies. Additionally, when conventional FM-CW transceiver systems are implemented in monolithic form, they require at least ten times the chip area than similar RF circuits, and since large chips have low yield, the cost may be quite prohibitive for large scale commercial applications.

Therefore, there is a need for an FM-CW transceiver system having a transmitter and receiver as a single unit as opposed to a conventional system having a separate transmitter and receiver. Further, there is a need to provide an FM-CW transceiver system having a simplified circuit using only two solid-state devices, a few passive devices, and does not require the use of either a circulator or coupler. The subject invention herein solves all of these problems in a new and unique manner which has not been part of the art previously.

SUMMARY OF THE INVENTION

An FM-CW radar transceiver suitable for use in motion-detector applications comprises an oscillator connected to an input of a power divider having first and second terminal outputs. The first terminal output of the power divider is connected to an input of a first diode and a first shorted stub. The second terminal output of the power divider is connected to an input of a phase shifter with the output of the phase shifter connected to an input of a second diode and a second shorted stub. The outputs of the first and second diodes are each connected to inputs of first and second intermediate frequency (IF) filters and then through first and second IF blocking structures terminating at a common antenna port. An open stub is connected to the common antenna port with the outputs of the first and second IF filters each connected to an IF port or channel. In use, the FM-CW transceiver operates as a frequency multiplier for transmitting, and simultaneously as a subharmonically pumped "I/Q" (In-phase, Quadrature-phase) mixer for reception.

An object of the present invention is to provide an FM-CW transceiver formed on a printed circuit board having two solid-state devices and a few passive devices which can be relatively accurately formed with predetermined shapes and dimensions, such that relatively little, if any, adjustment is required to obtain the required electrical characteristics.

Yet, still another object of the present invention is to have an FM-CW transceiver which can be mass-produced to precise dimensions with high reproducibility of electromagnetic characteristics.

Still, yet another object of the present invention is to provide an FM-CW transceiver which is especially simple in construction, particularly light weight and compact in design.

A further object of the present invention is to provide a low cost FM-CW transceiver which is far simpler than existing systems, using only two solid-state devices, and a few passive devices which does not require a circulator or coupler thereby eliminating a component that is very expensive either in terms of the direct cost of a circulator or the cost of wasted power in a coupler.

Accordingly, it is an object of the present invention to provide an effective, yet inexpensive FM-CW transceiver, which is rugged yet lightweight, more reliable, and less temperature sensitive then conventional FM-CW transceivers.

BRIEF DESCRIPTION OF THE DRAWINGS

The above, as well as other, advantages of the present invention will become readily apparent to those skilled in the art from the following detailed descriptions of the preferred embodiment when considered in light of the accompanying drawings in which.

DESCRIPTION OF THE PREFERRED EMBODIMENTS

Figure 1:
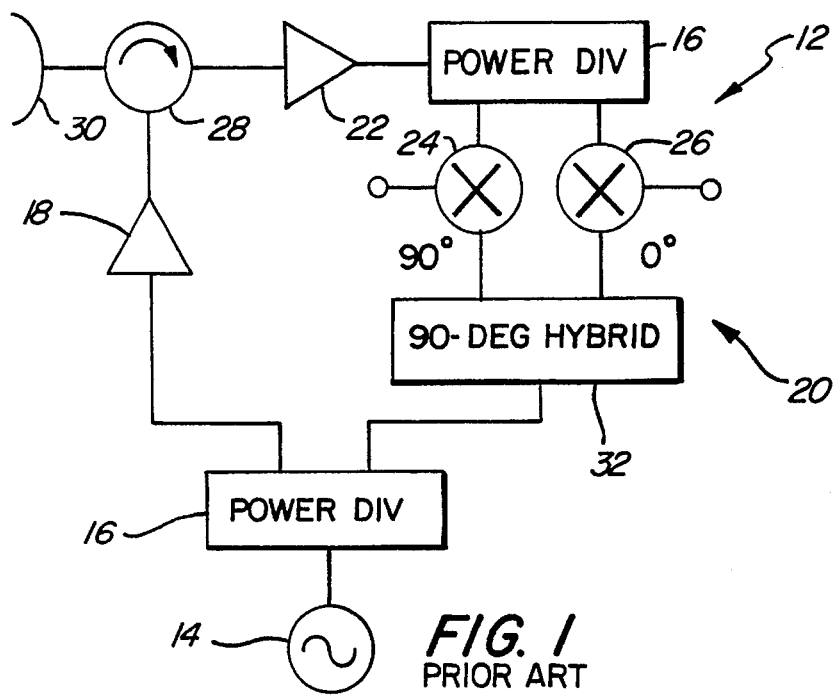
FIG. 1 is a conventional prior art FM-CW radar transceiver system.

Referring now to the drawings wherein like reference numerals refer to like and corresponding parts throughout, the FM-CW transceiver in accordance with the present invention is generally indicated by numeral 10. Referring now to the drawings, and more particularly to FIG. 1, there is shown a prior art conventional FM-CW transceiver 12 comprising an oscillator 14, power dividers 16, power amplifier 18 and a receiver portion 20. The receiver portion 20 consists of a low-noise amplifier 22, a ninety (90) degree quadrature hybrid 32 and a pair of "I-Q" mixers 24 and 26. A circulator 28 is used to connect the receiver and transmitter to the antenna 30. Although not shown, it may be envisioned that a directional coupler, because it is less expensive, may sometimes be used in place of the circulator 28 in systems where high loss is tolerable.

Referring once again to FIG. 1, the oscillator 14 provides both the transmitted signal and the local-oscillator (LO) for the mixers 24 and 26, respectively. It is essential in an FM-CW radar that both the receiver LO and transmitter use the same signal source. The power dividers 16 are used to split the signal between the receiver and transmitter with the additional quadrature hybrid power divider 32 needed to split the LO between the two mixers 24 and 26, respectively. It will be appreciated by those skilled in the art that a 90-degree phase difference in the output is necessary for proper functioning of a conventional FM-CW transceiver system.

Figure 2:
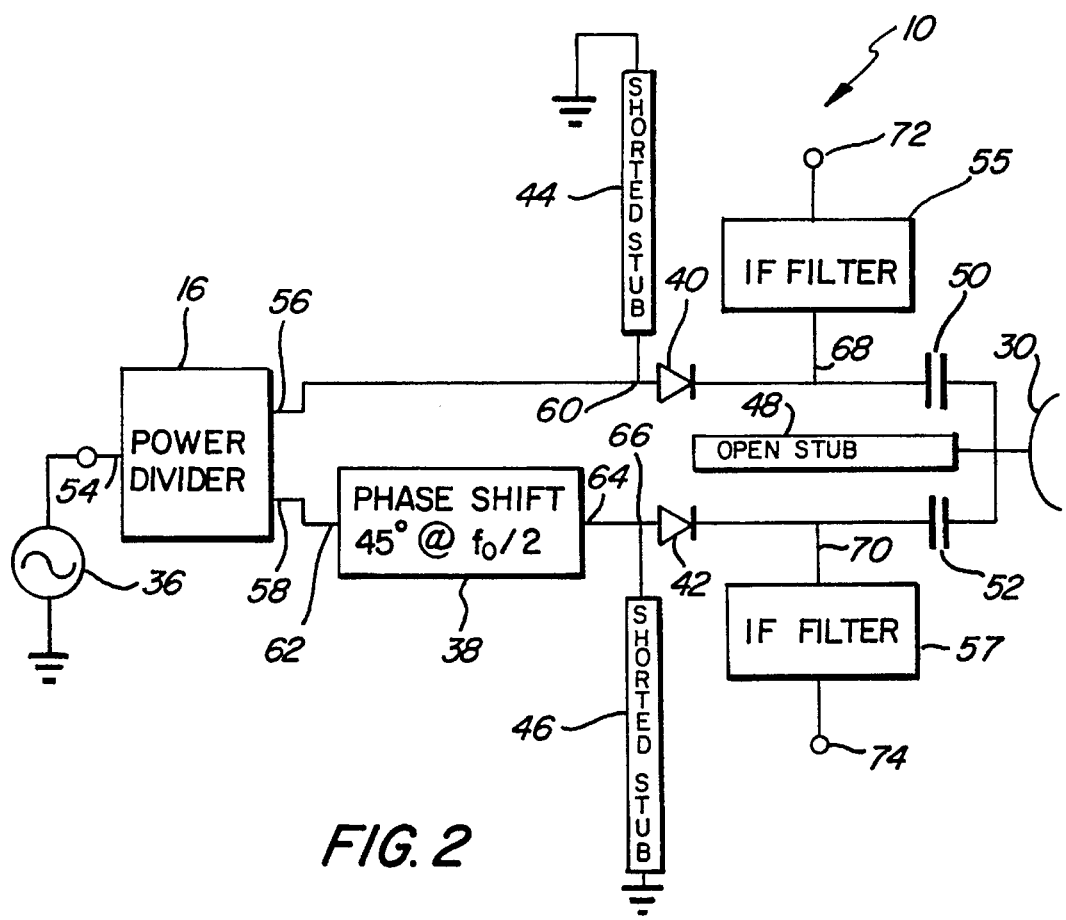
FIG. 2 is an FM-CW transceiver system in accordance with the present invention.

Turning now to FIG. 2, there is shown the FM-CW transceiver 10 in accordance with the present invention. The FM-CW transceiver 10 comprises of an oscillator 36, power divider 16, a 45-degree phase shifter 38, two diodes 40 and 42, first and second shorted stubs 44 and 46, open stub 48, two blocking capacitors 50 and 52, and two IF filters 55 and 57 (the functions of which can be realized in microstrip to reduce cost). It should be appreciated, that use of the aforementioned components provide an FM-CW transceiver 10 which is much simpler, less costly, more reliable, and more environmentally rugged than conventional FM-CW radar transceivers, as shown and described in FIG. 1.

Referring again to FIG. 2, the electrical characteristics of the first and second stubs, 44 and 46 respectively, and open stub 48, are chosen such that in operation the FM-CW transceiver 10 delivers an output frequency, $f_o$, when the oscillator 36 provides an input frequency, $f_o/2$, which is one-half the value of the output frequency, as will be more fully described below. In the preferred embodiment, the stubs 44, 46 and 48 are realized in microstrip and the desired electrical characteristics are achieved by establishing the appropriate widths and lengths of the microstrips, as is well known by persons skilled in the art of microwave engineering.

Referring once again to FIG. 2, the oscillator 36 of the FM-CW radar transceiver 10 is connected to an input 54 of the power divider 16 having first and second terminal outputs 56 and 58. The power divider 16, which normally is part of the microstrip circuit, can be any type of in-phase power splitter. The first terminal output 56 of the power divider 16 is connected to an input 60 of the first diode 40 and the first shorted stub 44. The second terminal output 58 of the power divider 16 is connected to the input 62 of the phase shifter 38 with the output port 64 of the phase shifter 38 connected to an input 66 of the second diode 42 and the second shorted stub 46.

The outputs of the first and second diodes 40 and 42, respectively, are each connected to inputs 68 and 70 of the first and second intermediate frequency (IF) filters 55 and 57 respectively, and then through the first and second IF blocking structures 50 and 52 respectively, terminating at a common antenna port 30. In the preferred embodiment, the IF blocking structures 50 and 52 respectively, are capacitors. The open stub 48 is connected to the common antenna port 30 with outputs 72 and 74 of the first and second IF filters 55 and 57 respectively, each connected to an IF port or channel. In use, the FM-CW transceiver 10 operates as a frequency multiplier for transmitting, and simultaneously as a subharmonically pumped "I/Q" (In-phase, Quadrature-phase) mixer for reception as will be more fully described below.

In use, for the transmit mode of the FM-CW transceiver 10, the input frequency, $f_o/2$, provided from the oscillator 36 is split by the power divider 16 thereby exciting the two diodes, 40 and 42. Due to the nonlinearity characteristics of the diodes, 40 and 42 respectively, and the electrical characteristics of the stubs 44, 46 and 48, the diodes 40 and 42 generate the output frequency, $f_o$, which is a second harmonic of the oscillator frequency, $f_o/2$, as will be more fully described below. This generated output frequency, $f_o$, or second harmonic-signal is then delivered to the antenna port 30 for electromagnetic transmission to the external environment.

At the output frequency, $f_o$, the shorted stubs, 44 and 46 respectively, have an effective electrical length of a one-half wavelength stub thereby providing a short circuit path and creating the appropriate virtual grounds at the diode terminals. Short circuiting the anodes of the diodes 40 and 42 to ground is necessary for good efficiency and low subharmonic radiation characteristic of FM-CW transceivers. The open stub 48 is a quarter wavelength stub at $f_o$ and acts effectively as an open circuit, and thus does not affect the output. Therefore, the second-harmonic currents in the diodes 40 and 42 combine in the output to provide the transmitted signal. Although the signals from the diodes 40 and 42 have a 90-degree phase difference, the combination of the two is not perfect but still provides adequate output power, typically between 3 to 6 dBm.

At the input frequency, $f_o/2$, the shorted stubs, 44 and 46 respectively, have an effective electrical length of a quarter wavelength stub thereby providing an open circuit path wherein the open stub 48 has an effective electrical length of a quarter wavelength stub thereby providing a short circuit path. This arrangement prevents radiation of the input frequencies energy, and effectively connects the diodes 40 and 42, respectively, directly to the output of the oscillator 36. The phase shifter 38 causes the input frequency, $f_o/2$, currents in the diodes 40 and 42 to have a 45 degree phase difference necessary for the diodes to behave as a mixer and generate the second harmonic signal.

For the receive mode of the FM-CW transceiver 10, an RF signal received by the antenna 30 is applied to the diodes 40 and 42 respectively, wherein the diodes 40 and 42 convert it to an intermediate frequency (IF). The IF signals from the individual diodes 40 and 42, exit through their respective IF filters, 55 and 57, and IF ports, 72 and 74. As described above, the shorted stubs 44 and 46 respectively, ground the anodes of the diodes, 40 and 42, at the second harmonic frequency or $f_o$, such that the diodes 40 and 42 are electrically in parallel with the antenna port 30.

Because the diodes 40 and 42 are pumped with a 45-degree phase difference at the input frequency $f_o/2$, their junction conductances are 90 degrees out of phase at the second harmonic frequency or output frequency $f_o$. With this phase difference, the two diodes 40 and 42, implement a pair of I/Q mixers. Capacitors 50 and 52 between the cathodes and the antenna connection 30 block IF currents from the antenna circuit. Although not shown, it may be envisioned that the above described components may also be realized by microstrip structures and a load resistor may be used as a current return and for providing a self bias at the I/O ports. Similarly, at low frequencies the open and shorted stubs could be realized by lumped element resonators, the shorted stubs 44 and 46, could be replaced by parallel resonance circuits at $f_o/2$, and the open stub 48 by a series resonance at $f_o/2$. This would result in a smaller more practical realization at frequencies below one Ghz.

Referring now to FIGS. 3 through 6, the RF performance of the transceiver 10 of the present invention is predicted by using a harmonic-balance circuit simulator, a general-purpose microwave circuit simulator which comprises of a computer program, that uses a harmonic-balance technique. Harmonic-balance analysis is a well established technique known in the electrical arts for microwave circuit simulation. Entered into the computer program are the parameters of the microstrip transmission lines, characteristics of the solid-state devices, values of the lumped elements, and their nodal interconnections, power levels and frequencies of excitations, as well as other miscellaneous data.

The results of the simulation depend most strongly on the characterization of the diodes 44 and 46: one can assume that the diodes are high-quality (i.e., expensive) devices and obtain better performance than with inexpensive devices. The diode parameters used for this simulation are those of typical low-cost silicon Schottky-barrier devices, which are commercially available and are typical of the diodes used in GaAs integrated circuits. It should be appreciated by those skilled in the art that diode microstrip circuits in accordance with the present invention are relatively easy to characterize accurately using harmonic-balance simulation.

Referring once again to FIGS. 1 through 6, there is shown various critical performance characteristics as a function of the sweep frequency for the FM-CW radar transceiver 10 of the present invention. A sweep frequency range of 4 GHz was used in the graphs; however, the range used in most practical radars is much less than this, rarely more than a few hundred MHz. The results shown are simulations performed at an output frequency of 77 GHz; however, they are typical of lower and higher frequencies.

Figure 3:
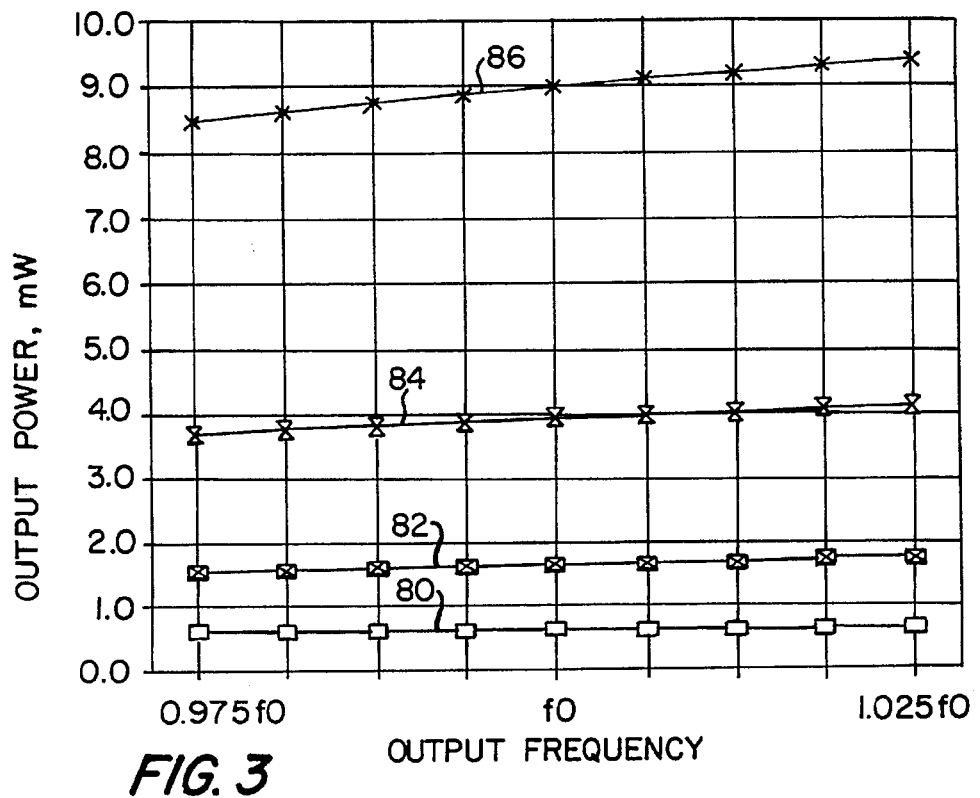
FIG. 3 is the predicted output characteristic from the transmitter as a function of sweep frequency of the FM-CW transceiver of the present invention.

Turning now to FIG. 3, there is shown the predicted output performance for the output power from the transmitter portion of the invention as a function of sweep frequency for four different input power levels 80, 82, 84 and 86 from the oscillator 36. The output power is important in establishing the range and sensitivity of the radar or motion detector. For most applications, including automotive radar, power levels of 1–2 mW are adequate. As shown in FIG. 3, the output power is fairly constant over the frequency range, a desired characteristic of FM-CW transceivers.

Figure 4:
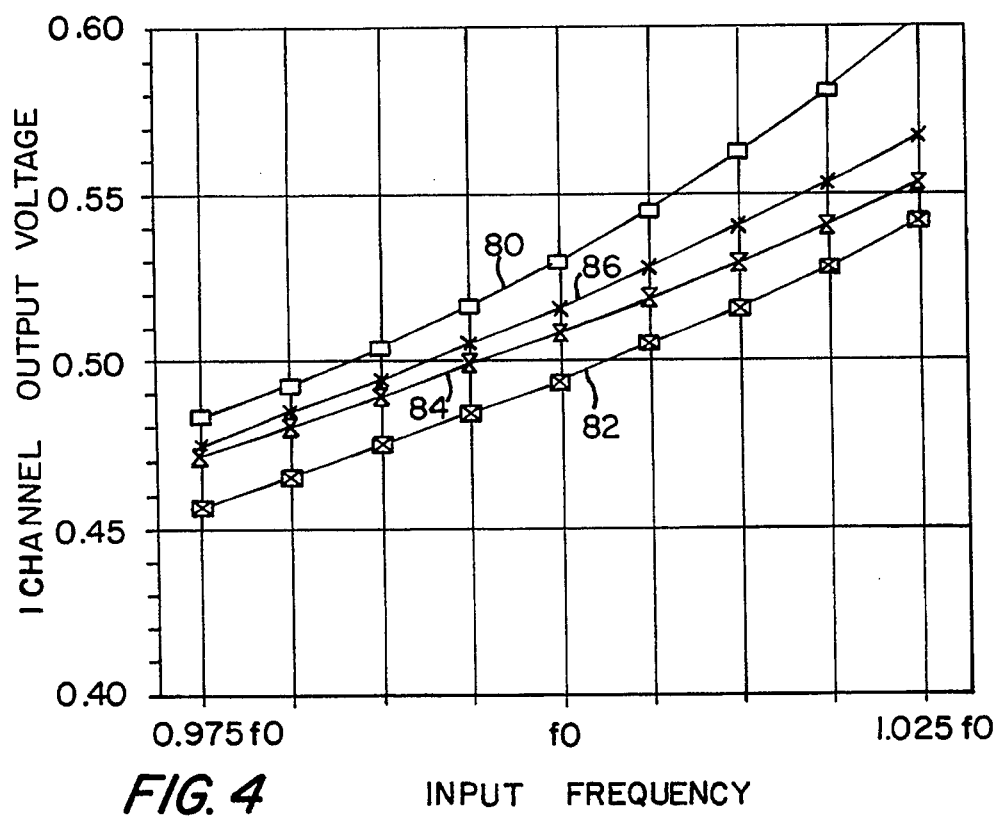
FIG. 4 is the predicted receiver conversion voltage gain as a function of sweep frequency of the FM-CW transceiver of the present invention.

Referring now to FIG. 4, there is shown the predicted output voltage of the I channel per volt 72 of received signal at the antenna port 30. This is the most critical parameter in establishing the receiver's sensitivity and is shown for the four different input power levels 80, 82, 84 and 86, (+13, +16, +19, and +22 dbm, respectively) from the oscillator 36. This parameter is used to calculate the receiver's noise figure and plot the amplitude ratio which can determine the Q-channel output level 74.

Figure 5:
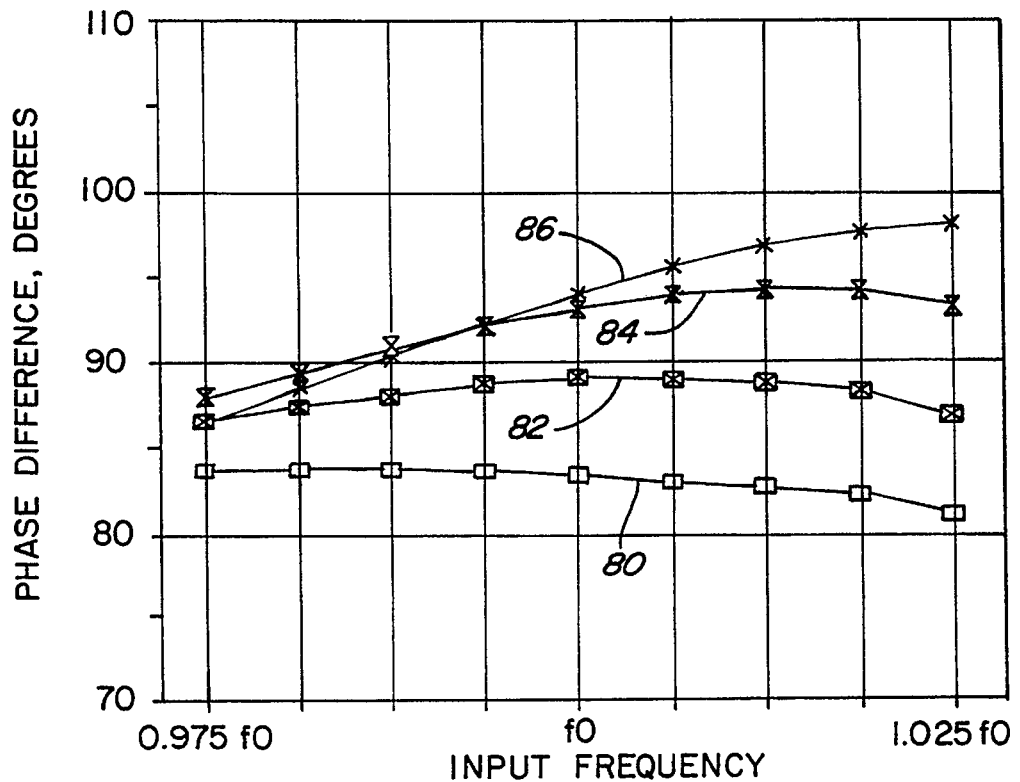
FIG. 5 is the predicted output phase difference as a function of sweep frequency of the FM-CW transceiver of the present invention.

Turning now to FIG. 5, there is shown the predicted difference in phase of the receiver I and Q outputs 72 and 74 respectively, when a sinusoidal received signal is applied to the antenna port 30. The FM-CW radar transceiver 10 requires two outputs: these are the "I" and "Q" outputs (for "in-phase" and "quadrature-phase" channels, respectively). The two channels 72 and 74 are necessary to obtain full information about the Doppler frequency shift of the returned signal. Ideally, with a sinusoidal input, these outputs have a 90-degree phase difference. A few degrees of deviation from the ideal value is easily tolerable as shown in FIG. 5 for the four input power levels 80, 82, 84 and 86.

Figure 6:
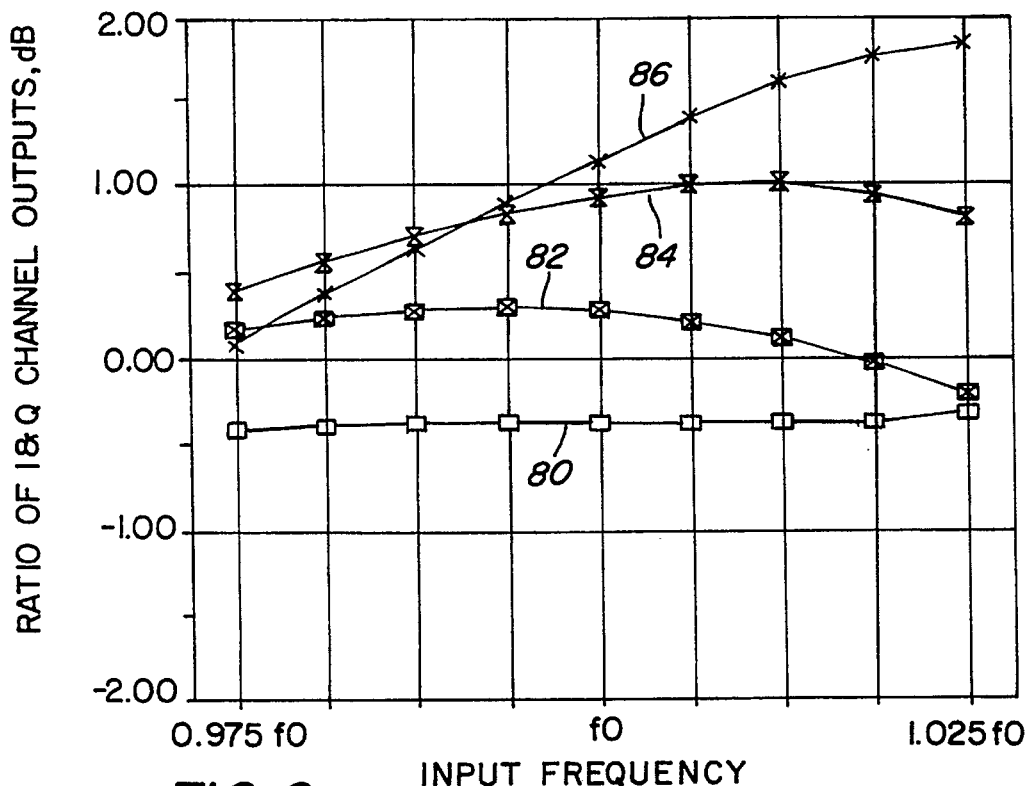
FIG. 6 is the predicted amplitude ratio of voltages at the output of the IF channels as a function of sweep frequency of the FM-CW transceiver of the present invention.

Referring now to FIG. 6, there is shown the predicted ratio of voltages at the output of the I and Q channels 72 and 74, in dB (=20 log (VI/VQ) ) when a single sinusoidal received signal is applied to the antenna port 30 for the four input power levels 80, 82, 84 and 86. As shown in FIG. 6, ideally, the I and Q channels 72 and 74 should have equal output levels, but deviations of 1–2 dB are tolerable.

The above shown predictions using the harmonic-balance method is exact, within numerical limits governed by such factors as the truncation of infinite series used in the algorithm and the computer's numerical precision. Any errors in prediction come primarily from the limited accuracy of describing the transmission lines and solid-state devices in the simulator, and the difficulty of characterizing such parasitic effects as radiation from transmission the lines, resonances in chip capacitors, and heating effects in solid-state devices. Nevertheless, previous experience with similar circuits at similar frequencies has shown that the type of analysis used here is normally within the following limits at 77 GHz:

| Transmitter output power levels: | +/– 1.0 dB |
|---|---|
| Receiver output amplitude: | +/– 0.5 dB |
| Receiver phase: | +/– 5 degrees |
| Noise figure: | +/– 1.0 dB |

Additionally, accuracy improves as frequency decreases. Thus, a 10 to 24 GHz implementation of the transceiver 10 should be well within these limits which has many useful applications as described below.

In the preferred embodiment, the transceiver 10 of the present invention is used for automotive radar. However, it should be understood that the frequencies used in the above example are those of the automotive radar band; these frequencies are used solely as an example, and the transceiver 10 is generally useful in a wide variety of motion-detector applications. It can be used in environments where other similar motion detectors or other RF sources are operating, with minimal interference. Therefore, this invention is ideal for automotive theft-deterrent systems and could be used to detect the following intrusions: Glass breakage in automobiles or buildings; unauthorized car movement (e.g., attempts to tow or push a car); movement of people in a room or building, and approach of persons or vehicles to a gate or fence line.

Additionally, the transceiver 10 in accordance with the present invention is cost-competitive with ultrasonics, but should have a greater sensitivity and therefore greater range of detection. Most microwave sensors use a waveguide circuit near 10 GHz consisting of a Gunn oscillator, a waveguide circulator, and a Schottky-diode receiver. The transceiver 10 described here is much less expensive because it can be produced as an integrated circuit or as a microstrip circuit, and requires no waveguide components. Also the transceiver 10 is ideal for warning of back-up collisions in trucks and busses.

There is no lower limit to the frequency of application of this invention; all parts of the circuit can be realized in a practical manner at arbitrarily low frequencies. High-frequency applications are limited by (1) loss of efficiency of the frequency multiplication in the transmitter, resulting in low output power; (2) AM noise of the oscillator (as frequency increases, oscillators tend to be noisy, and the oscillator noise reduces the sensitivity of the receiver); (3) circuit elements become physically very small, and fabrication becomes difficult and expensive. However, since the oscillator operates at half the output frequency, the transceiver 10 has nearly twice the upper frequency limit of conventional FM-CW radars.

There has been described and illustrated herein, an improved FM-CW radar transceiver formed by microstrip technology which can be relatively accurately formed and mass produced with predetermined shapes and dimensions, such that relatively little, if any, adjustment is required to obtain an FM-CW radar transceiver having high reproducibility of electromagnetic characteristics.

While particular embodiments of the invention have been described, it is not intended that the invention be limited exactly thereto, as it is intended that the invention be as broad in scope as the art will permit. The foregoing description and drawings will suggest other embodiments and variations within the scope of the claims to those skilled in the art, all of which are intended to be included in the spirit of the invention as herein set forth.

What is claimed is:

1. An FM-CW radar transceiver for use in motion-detector applications comprising:

an oscillator;

said oscillator electrically connected to an input of a power divider, said power divider having first and second terminal outputs;

said first terminal output of said power divider electrically connected to an input of a first diode and a first shorted stub, and said second terminal output of said power divider electrically connected to an input of a phase shifter with an output of said phase shifter electrically connected to an input of a second diode and a second shorted stub;

said first and second diodes having outputs, said first diode output electrically connected to an input of a first frequency filter and to an input of a first IF blocking structure, and said second diode output electrically connected to an input of a second frequency filter and to an input of a second IF blocking structure, said first and second IF blocking structures having outputs terminating at a common antenna port;

an open stub electrically connected to said common antenna port and, said first and second frequency filters having outputs each said frequency filter output connected to an IF channel, wherein said FM-CW transceiver operates as a frequency multiplier for transmitting, and simultaneously as a subharmonically pumped in-phase, quadrature-phase mixer for reception.

2. An FM-CW radar transceiver according to claim 1, wherein said oscillator provides an input frequency which is one-half the value of an output frequency.

3. An FM-CW radar transceiver according to claim 1, wherein said power divider is fabricated from microstrip.

4. An FM-CW radar transceiver according to claim 1, wherein said power divider is fabricated from discrete components.

5. An FM-CW radar transceiver according to claim 1, wherein said phase shifter is fabricated from microstrip.

6. An FM-CW radar transceiver according to claim 2, wherein said phase shifter provides a forty-five degree phase difference at said input frequency.

7. An FM-CW radar transceiver according to claim 1, wherein said power shifter is fabricated from discrete components.

8. An FM-CW radar transceiver according to claim 1, wherein said first and second shorted stubs are fabricated from microstrip.

9. An FM-CW radar transceiver according to claim 1, wherein said first and second shorted stubs are fabricated from discrete components.

10. An FM-CW radar transceiver according to claim 2, wherein said first and second shorted stubs have an effective electrical characteristic of one-half wavelength at said output frequency and a quarter wavelength at said input frequency.

11. An FM-CW radar transceiver according to claim 1, wherein said first and second IF filters are fabricated from microstrip.

12. An FM-CW radar transceiver according to claim 1, wherein said first and second IF filters are fabricated from discrete components.

13. An FM-CW radar transceiver according to claim 1, wherein said first and second blocking structures are capacitors.

14. An FM-CW radar transceiver according to claim 1, wherein said first and second blocking structures are fabricated from microstrip.

15. An FM-CW radar transceiver according to claim 1, wherein said open stub is fabricated from microstrip.

16. An FM-CW radar transceiver according to claim 1, wherein said open stub is fabricated from discrete components.

17. An FM-CW radar transceiver according to claim 2, wherein said open stub is have an effective electrical characteristic of one-half wavelength at said output frequency and a quarter wavelength at said input frequency.

18. An FM-CW radar transceiver for use in motion-detector applications comprising:

an oscillator, said oscillator providing an input frequency which is one-half the value of an output frequency;

said oscillator electrically connected to an input of a power divider, said power divider having first and second terminal outputs;

said first terminal output of said power divider electrically connected to an input of a first diode and a first shorted stub, and said second terminal output of said power divider electrically connected to an input of a phase shifter with an output of said phase shifter electrically connected to an input of a second diode and a second shorted stub;

said first and second shorted stubs having an effective electrical characteristic of one-half wavelength at said output frequency and a quarter wavelength at said input frequency said first and second diodes having outputs, said first diode output electrically connected to an input of a first frequency filter and to an input of a first IF blocking structure, and said second diode output electrically connected to an input of a second frequency filter and to an input of a second IF blocking structure, said first and second IF blocking structures having outputs terminating at a common antenna port;

an open stub electrically connected to said common antenna port said open stub having an effective electrical characteristic of one-half wavelength at said output frequency and a quarter wavelength at said input frequency and, said first and second frequency filters having outputs each said frequency filter output connected to an IF channel, wherein said FM-CW transceiver operates as a frequency multiplier for transmitting, and simultaneously as a subharmonically pumped in-phase, quadrature-phase mixer for reception.

19. An FM-CW radar transceiver according to claim 18, wherein said first and second blocking structures are capacitors.

20. An FM-CW radar transceiver for use in motion-detector applications comprising:

an oscillator, said oscillator providing an input frequency which is one-half the value of an output frequency;

said oscillator electrically connected to an input of a power divider, said power divider having first and second terminal outputs;

said first terminal output of said power divider electrically connected to an input of a first diode and a first shorted stub, and said second terminal output of said power divider electrically connected to an input of a phase shifter with an output of said phase shifter electrically connected to an input of a second diode and a second shorted stub, said phase shifter provides a forty-five degree phase difference at said input frequency;

said first and second shorted stubs having an effective electrical characteristic of one-half wavelength at said output frequency and a quarter wavelength at said input frequency said first and second diodes having outputs, said first diode output electrically connected to an input of a first frequency filter and to an input of a first IF blocking structure, and said second diode output electrically connected to an input of a second frequency filter and to an input of a second IF blocking structure, said first and second IF blocking structures having outputs terminating at a common antenna port;

an open stub electrically connected to said common antenna port said open stub having an effective electrical characteristic of one-half wavelength at said output frequency and a quarter wavelength at said input frequency and, said first and second frequency filters having outputs each said frequency filter output connected to an IF channel, wherein said FM-CW transceiver operates as a frequency multiplier for transmitting, and simultaneously as a subharmonically pumped in-phase, quadrature-phase mixer for reception.

* * * * *